Feb. 4, 1930.    F. R. DAGLEY    1,746,073
SHEARS
Filed April 6, 1929

F. R. Dagley,
INVENTOR
BY Victor J. Evans
ATTORNEY

Patented Feb. 4, 1930

1,746,073

UNITED STATES PATENT OFFICE

FRED R. DAGLEY, OF KNOXVILLE, TENNESSEE

SHEARS

Application filed April 6, 1929. Serial No. 353,156.

The object of this my present invention is the provision of pruning shears that includes a swingable jaw having a curved or arcuate cutting surface and a shank that is provided with a V-shaped end whose angle portions each provide jaws, the inner jaw being toothed, the swingable jaw being pivoted to the shank and movable over the fixed jaws by the pulling of a lever which has a link connection with both the swingable jaw and the shank of the fixed jaws and whereby a single operation, that is, a pull on the handle will cause a shearing action between the swingable and fixed jaws to easily and quickly sever branches and other foliage.

To the attainment of the foregoing the invention consists in the improvement hereinafter described and definitely claimed.

Figures 1, 2, 3:
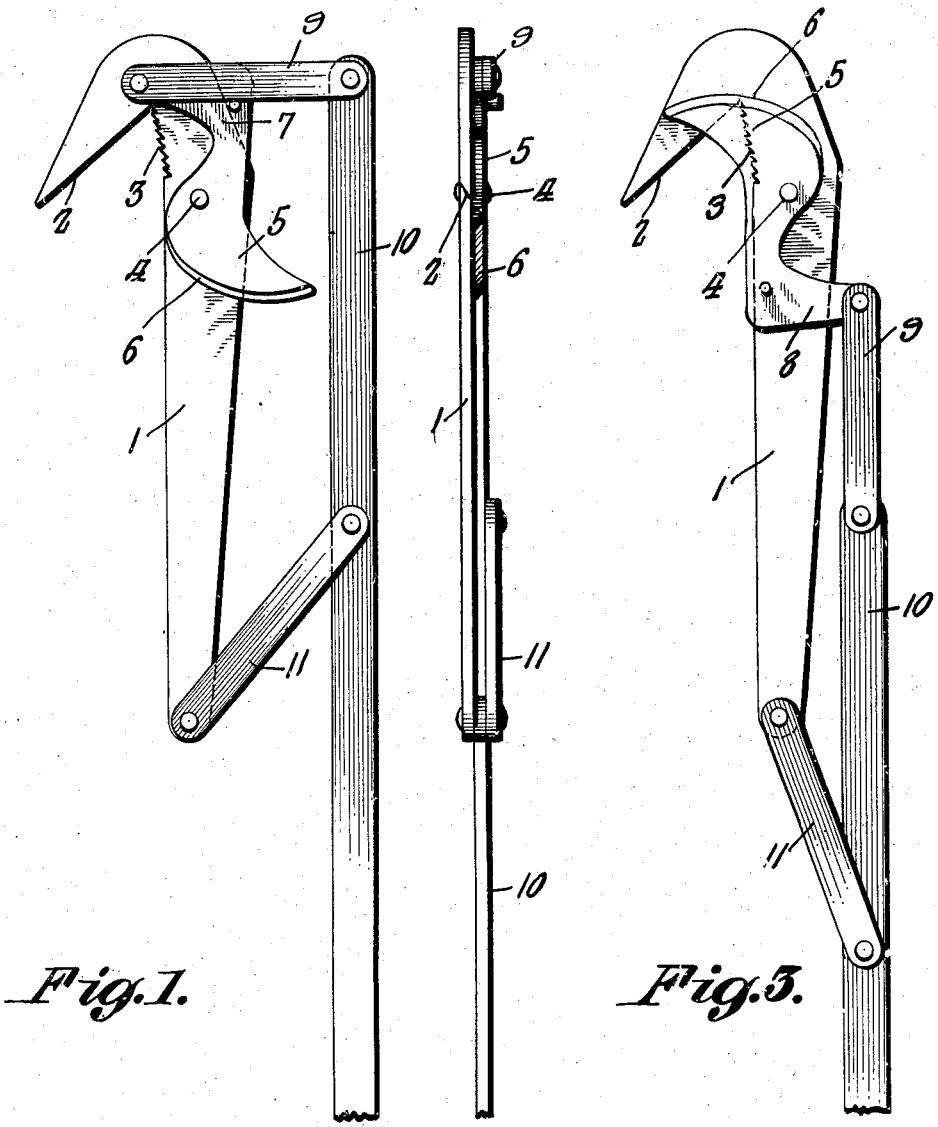
Figure 1 is a side elevation of the improvement showing the swingable jaw in open position.
Figure 2 is an edge view thereof.
Figure 3 is a view similar to Figure 1 but showing the swingable jaw closed or swung over the movable jaws.

In carrying out my invention I make use of a flat shank 1 which is of suitable material. This shank, at its outer end, is formed with an offset portion whose inner wall is arranged at an angle and is sharpened to provide a cutting jaw 2. The shank at the juncture of the cutting jaw is also cut at an angle and is toothed to provide a second stationary cutting jaw 3.

There is pivoted, as at 4, to the shank 1, directly inward of the toothed jaw 3 a swingable jaw 5. This jaw has its active end arcuate, or cut to describe a circle and the edge thereof is sharpened, as at 6. The jaw 5 is formed with a reduced extension that is formed with an offset angle portion 8 and to this angle portion there is pivoted a link 9. The link 9 is pivotally secured to one end of an operating handle 10. There is also pivoted to the outer end of the shank 1 a second link 11 which is likewise pivoted to the handle 10.

The jaws are disclosed in open position when arranged in a position disclosed by Figure 1 of the drawings. It will be seen that a branch or like foliage may be arranged between the stationary jaws 2 and 3. A pull upon the handle 10 in a downward direction will swing the jaw 5 to cause the arcuate and sharpened edge 6 thereof to sweep over the flat faces of the jaws 2 and 3 and thereby effect a shearing cut upon the branch or foliage received between the said jaws. It will be noted that the movement of the jaw 5 provides first a cooperating shearing and cutting movement between the jaw 5 and the stationary jaw 2 and thereafter a similar cutting movement between the said jaw 5 and the toothed jaw 3.

The improvement is of an extremely simple construction and may be operated by one hand of the user, and the advantages thereof will, it is thought, be understood and appreciated by those skilled in the art without further detailed description.

Having described the invention, I claim:

In a pruning shears, a shank having an offset end, providing a lower angle wall which is sharpened to afford a jaw, said shank at the juncture of the jaw being inclined and toothed to provide a second jaw, a swingable jaw having an arcuate cutting surface pivoted to the shank inward of the toothed jaw, said swingable jaw having an offset end, an operating handle, and links, one of which is pivoted to the offset end of the swingable jaw and to the handle and the other to the end of the shank and to the handle.

In testimony whereof I affix my signature.

FRED R. DAGLEY.